United States Patent [19]

Ichikawa

[11] Patent Number: 4,556,957
[45] Date of Patent: Dec. 3, 1985

[54] SYSTEM FOR DEFINING GRAPHIC PATTERNS FOR A NUMERICAL CONTROL APPARATUS

[75] Inventor: Toru Ichikawa, Aichi, Japan

[73] Assignee: Mitsubishi Denki Kabushiki Kaisha, Tokyo, Japan

[21] Appl. No.: 527,719

[22] Filed: Aug. 30, 1983

[30] Foreign Application Priority Data

Aug. 31, 1982 [JP] Japan .................................. 57-151475
Sep. 6, 1982 [JP] Japan .................................. 57-155003

[51] Int. Cl.$^4$ ............................................. G06F 15/46
[52] U.S. Cl. .................................... 364/171; 318/568; 364/191; 364/474
[58] Field of Search ................................ 364/167–171, 364/191–193, 474, 475, 200, 900; 318/568

[56] References Cited

U.S. PATENT DOCUMENTS

| | | | |
|---|---|---|---|
| 4,010,356 | 3/1977 | Evans et al. | 364/171 |
| 4,115,858 | 9/1978 | Kaufman | 364/474 |
| 4,152,765 | 5/1979 | Weber | 364/474 X |
| 4,209,847 | 6/1980 | Noda et al. | 364/167 X |
| 4,328,550 | 5/1982 | Weber | 364/474 X |
| 4,484,286 | 11/1984 | Nagamine et al. | 364/167 X |
| 4,490,781 | 12/1984 | Kishi et al. | 364/171 X |

OTHER PUBLICATIONS

Hutchins—"Part Boundary, A Quantum Increase in Shape Description and Cutting Capability"—Numerical Control Society, Proc. of Annual Meeting and Tech. Conf., Mar. 31–Apr. 3, 1974—pp. 229–241.
Wright—"Graphics Interactive Programming Language"—Proc. of the 14th Annual Meeting and Technical Conference of the Numerical Control Society, Mar. 13–16, 1977, pp. 23–24.
Bessey—"La Programmation Des Pieces pour La Commande Numerique", Machine Moderne, No. 819, Oct. 1977—pp. 50-55.

Primary Examiner—Joseph Ruggiero
Attorney, Agent, or Firm—Sughrue, Mion, Zinn, Macpeak & Seas

[57] ABSTRACT

A system for calculating machining patterns from input data, including unknowns, to control an NC apparatus. The system includes a display device, a display control device, a data setting device, a memory, a computing device, a central processing device and an output control device. The display control device controls the display device to display, as head items, addresses comprising the designation of a straight line or an arc for a planar graphic pattern, the coordinates of an ending point of the graphic pattern, a vector angle of the straight line or a radius of the arc, vector components of the straight line or coordinates of the center of the arc, and modifiers. The data setting device sets known data by successively or appropriately using addresses displayed on the display device and indicative of the straight line and the arc derived from the planar graphic pattern. The memory stores the addresses, the data set by the data setting device, and formulas. The computing device computes the set data stored in the memory according to the formulas to determine the addresses of unknown data which have not been given numerical values by the data setting device. The central processing device controls the computing device and the memory to store the results of computation effected by the computing device. The output control device is responsive to the set data and computed data stored in the memory for controlling the movement of a machine tool.

17 Claims, 42 Drawing Figures (A-1)

(A-6)

(A-7)

(PTN2)

FIG. 8

| NO. | G CODE | X | Y | R/θ | I | J | P | CNR/CNC |
|---|---|---|---|---|---|---|---|---|
| A-1 | 1 | ○ | ○ | | | | | ○ |
| A-2 | 1 | ○ | ? | ○ | | | | ○ |
| A-3 | 1 | ? | ○ | ○ | | | | ○ |
| A-4 | 1 | ○ | ? | ?/→ | ○ | ○ | | ○ |
| A-5 | 1 | ? | ○ | ?/→ | ○ | ○ | | ○ |
| A-6 | 2/3 | ○ | ○ | ○ | | | | ○ |
| A-7 | 2/3 | ○ | ○ | ?/→ | ○ | ○ | | ○ |
| A-8 | 2/3 | ○ | ? | ?/→ | ○ | ○ | ○ | ○ |
| A-9 | 2/3 | ? | ○ | ?/→ | ○ | ○ | ○ | ○ |
| A-10 | 2/3 | ○ | ○ | ?/→ | ○ | ? | | ○ |
| A-11 | 2/3 | ○ | ○ | ?/→ | ? | ○ | | ○ |
| B-1 | 1 | ? | ? | ○ | | | (○) | ○ |
| B-2 | 1 | ? | ? | ?/→ | ○ | ○ | (○) | ○ |
| B-3 | 1 | ? | ? | ?/→ | ?/→ | ?/→ | (○) | ○ |
| B-4 | 2/3 | ? | ? | ?/→ | ○ | ○ | (○) | ○ |
| B-5 | 2/3 | ? | ? | ○ | ?/→ | ?/→ | ○ | ○ |
| C-1 | 1 | ○ | ○ | ○ | | | (○) | ○ |
| C-2 | 1 | ○ | ○ | ?/→ | ○ | ○ | (○) | ○ |
| C-3 | 2/3 | ○ | ○ | ○ | ○ | ○ | (○) | ○ |
| C-4 | 2/3 | ○ | ? | ○ | ○ | ○ | (○) | ○ |
| C-5 | 2/3 | ? | ○ | ○ | ○ | ○ | (○) | ○ |
| C-6 | 2/3 | ? | ? | ○ | ○ | ○ | (○) | ○ |

(A-2)

(A-3)

(A-4)

(A-5)

(A-8)

(A-9)

(A-10)

(A-11)

(B-1)

(B-2)

(B-3)

(B-4)

(B-5)

(C-1)

(C-2)

(C-3)

(C-4)

(C-5)

(C-6)

| PTN | Z | X | Y | AN1 | AN2 | T1 | T2 | N1 | N2 | TSL | P | Q |
|---|---|---|---|---|---|---|---|---|---|---|---|---|
| 1 | z | x | y | — | — | — | — | — | — | — | ◯ | ◯ |
| 2 | z | x | y | $\theta_1$ | — | $t_1/\ell_1$ | — | $n_1$ | — | INC/ABS | — | ◯ |
| 3 | z | x | y | $\theta_1$ | $\theta_2$ | $t_1/\ell_1$ | $t_2/\ell_2$ | $n_1$ | $n_2$ | INC/ABS | ◯ | ◯ |
| 4 | z | x | y | $\theta_1$ | $\theta_2$ | $t_1/\ell_1$ | $t_2/\ell_2$ | $n_1$ | $n_2$ | INC/ABS | ◯ | ◯ |
| 5 | z | x | y | $\theta_1$ | — | R | — | $n_1$ | — | — | — | — |
| 6 | z | x | y | $\theta_1$ | $\theta_2$ | R | — | $n_1$ | — | INC/ABS | — | ◯ |
| 7 | z | x | y | $\theta_1$ | — | R | $\ell_3$ | — | — | — | ◯ | — |

FIG. 33 (PTN 1)

FIG. 34 (PTN 2)
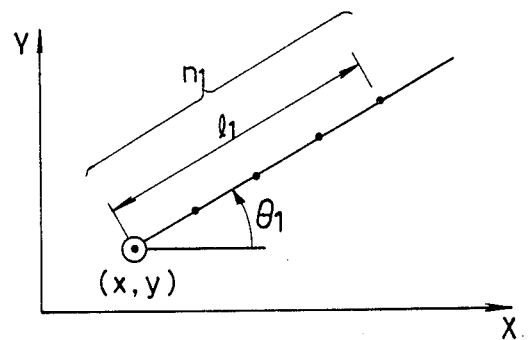
FIG. 35 (PTN 3)
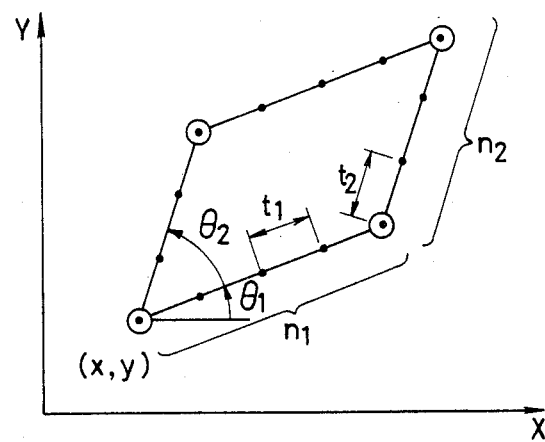

FIG. 36 (PTN 4)
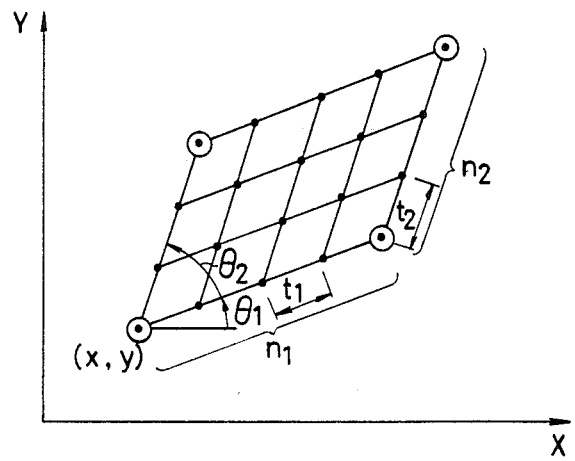
FIG. 37 (PTN 5)
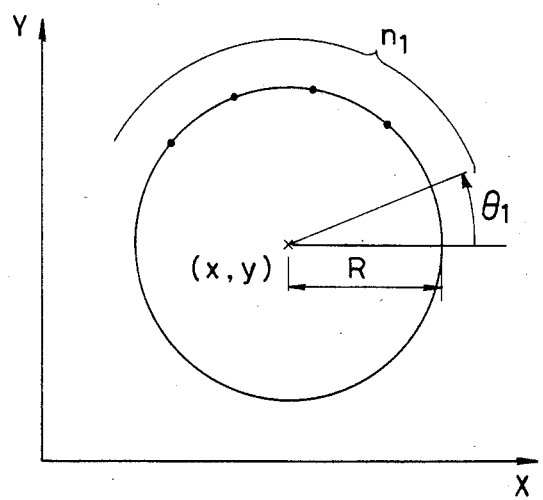

FIG. 38 (PTN 6)
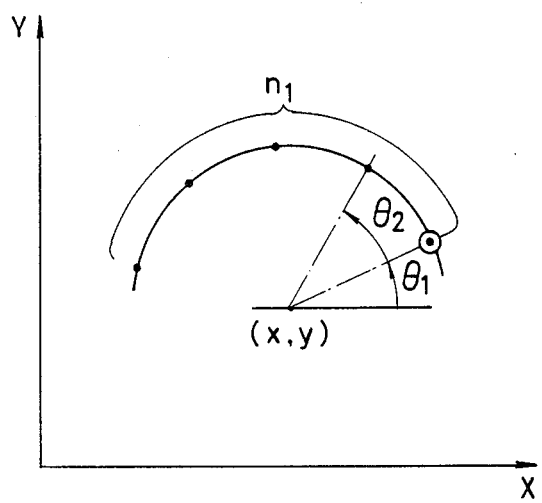
FIG. 39 (PTN 6)
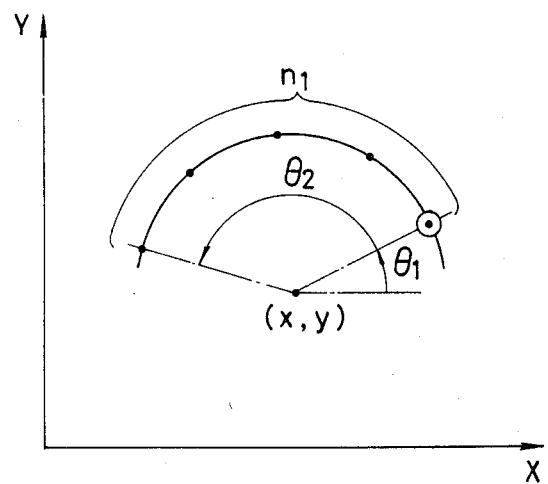

FIG. 40 (PTN 7)
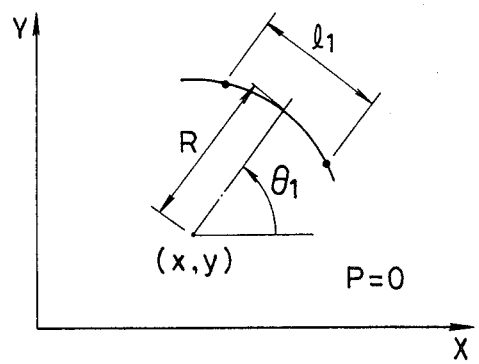
FIG. 41 (PTN 7)
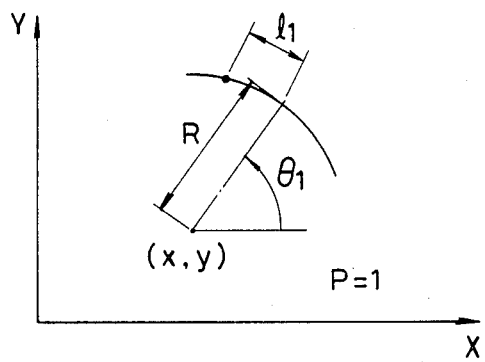
FIG. 42 (PTN 7)
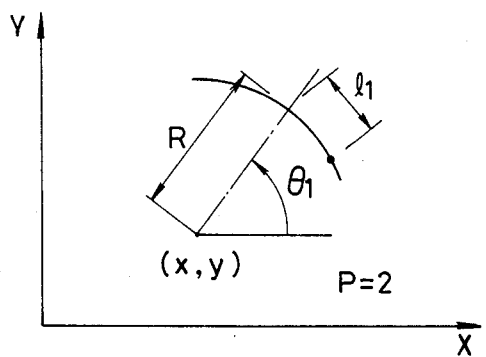

SYSTEM FOR DEFINING GRAPHIC PATTERNS FOR A NUMERICAL CONTROL APPARATUS

BACKGROUND OF THE INVENTION

The present invention relates to a system for defining graphic patterns for a numerical control apparatus.

For driving machine tools under the control of numerical control apparatus (hereinafter referred to as "NC apparatus"), it is general practice to store in a memory unit various data, such as, for example, the paths of movement of the tool of the machine tool, the positions where the tool is to operate on the workpiece, and the operations to be effected by the tool on the workpiece at these positions, the data being entered through an input unit of the NC apparatus. These data are computed and processed in a control unit and an arithmetic unit and the results are delivered through an output unit to a tool actuator.

Numerically controlled machine tools (hereinafter referred to as "NC machine tools") controlled by the NC apparatus are given a tool position with respect to a workpiece under the command of numerical information, and are controlled by the results of arithmetic operations effected by the NC apparatus to enable the tool to machine the workpiece. NC machine tools can machine workpieces into complex configurations with ease and high precision at a high rate of production.

The NC machine tool is generally constructed as shown in FIG. 1 of the accompanying drawings. The NC machine tool basically comprises an NC apparatus 20 for computing numerical information commands supplied from an external source through an input terminal 10 and a machine tool 30 controlled by the results of arithmetic operations effected in the NC apparatus 20. The NC apparatus 20 is composed of an input unit 21 to which external commands are supplied, an arithmetic unit 22 for computing the commands delivered from the input unit 21, a memory unit 23 for storing the results of the arithmetic operations of the arithmetic unit 22 and the commands from the input unit 21, and other information, a control unit 24 for controlling the arithmetic operations of the arithmetic unit 22, and an output unit 25 for issuing computed values such as the results of the arithmetic operations of the arithmetic unit 22. The machine tool 30 has a tool 31 attached to a tool holder 32 mounted on the chuck of a spindle 33 rotated by a spindle motor 34 driven by signals issued from the output unit 25 of the NC apparatus 20.

A workpiece 40 to be machined by the machine tool 30 is fixed by jigs or the like to a table 35 of the machine tool 30. The machine tool 30 also includes a ball screw 36 for moving the table 35 in the direction of the X axis. The ball screw 36 is driven by an X-axis motor 38 through a gear box 37, the X-axis motor 38 being driven by signals from the output unit 25 of the NC apparatus 20. The machine tool 30 also includes mechanisms (not shown), identical to the X-axis drive motor 38 and the ball screw 36 for moving the table 35 in the directions of Y- and Z-axes. These mechanisms are also driven by signals supplied from the NC apparatus 20.

The following means have been employed for entering, through the input unit 21 of the NC apparatus 20, the graphic patterns to be followed by the tool or the machining positions to be taken by the tool, of the NC machine.

More specifically, the following elements are known for defining the graphic patterns to be followed by the tool:

Example 1. Linear interpolation (FIG. 2) G01 Xx1 Yy1 Ff1;

Example 2. Circular interpolation (Arc with a designated radius, FIG. 3) G02 (G03) Xx1 Yy1 Rr1 Ff1;

Example 3. Circular interpolation (Arc with designated coordinates of the arc center, FIG. 4) G02 (G03) Xx1 Yy1 Ii1 Jj1 Ff1.

FIGS. 2 through 4 are illustrative of Examples 1 through 3, and designated at x0, y0 are the coordinates of a starting point, x1, y1 the coordinates of an ending point, r1 a radius, i1, j1 the coordinates of the arc center. In each of the examples, f1 represents the feed speed.

Where the straight line of Example 1 shown in FIG. 2 is to be defined, there are employed a symbol G01 which indicates a straight line, the coordinates Xx1, Yy1 of an ending point of the line, and a feed speed Ff1 for the tool. The arcs can be defined in a similar manner. Symbols G02, G03 used in Examples 2, 3 are G codes indicating arcs or circular interpolation. The code G02 represents clockwise rotation of the tool, and the code G03 represents counterclockwise rotation of the tool. Therefore, the arrowheads on the arcs illustrated in FIGS. 3 and 4 indicate the code G02 (clockwise rotation).

In FIG. 3, two arcs are plotted which interconnect the starting point (x0, y0) and the ending point (x1, y1). These two arcs are distinguished by whether the sign of the radius is positive or negative. If the sign of the radius is positive, then the arc to be drawn is smaller than a semicircle, and if the sign of the radius is negative, then the arc is greater than a semicircle.

Thus, graphic patterns have been defined by entering G codes having various meanings, the coordinates of the ending points of the lines, tool feed speeds, and arc radii in the form of numerical information as illustrated in Examples 1 through 3.

With the conventional graphic pattern definition system, it is necessary to designate the coordinates of ending points, and thus these data need to be known prior to being entered into the NC apparatus. Where the graphic pattern to be entered is complex, intersection computation to find the coordinates of the ending points involves an increased expenditure of time and labor. The addresses X, Y, R, I, J have to be entered each time the numerical values are to be set, thus requiring extra keyboarding operations.

There have been known methods (shown in FIGS. 5 and 6) for defining the machining positions for a tool as a group of points. The definition of such machining positions as a group of points is employed for an NC apparatus for driving a machine tool such as a machining center to bore or tap a workpiece at the positions indicated by the group of points. FIG. 5 is illustrative of a group of points entered as arranged in a row, and FIG. 6 is illustrative of a group of points entered as arranged in a grid-like pattern.

For the row of points shown in FIG. 5, data are entered in the NC apparatus in the form of numerical information: G35XxYyIt1J01Kn1*. G35 is a G code for designating a line at an angle, meaning a straight line inclined at a prescribed angle with respect to a reference line. Designated at X, Y are addresses indicative of the coordinates of a starting point, I an address indicative of the pitch or point-to-point interval t1, J an address indicative of the angle θ1 formed between the line passing through the row of points and the X axis, and K is an address representing the number of machining positions required.

For the grid-like dot pattern illustrated in FIG. 6, numerical information: G37XxYyIt1Pn1Jt2Kn2* is employed to enter data in the NC apparatus. G37 is a G code designating a grid, and indicates a group of points to be plotted in a grid-like pattern. Designated in this information labeled by G37 are X, Y address indicating the coordinates of a starting point, I an address indicative of the pitch or point-to-point interval in the direction of the X axis, P an address representative of the number of machining positions in the X-axis direction, J an address representing the pitch or point-to-point interval in the direction of the Y axis, and K an address representative of the number of machining positions in the Y-axis direction.

With the foregoing definition of groups of points, the addresses used have to be entered simultaneously with the numerical values needed. While "J" in the information group headed by G35 is indicative of the angle with respect to the X axis, the same symbol indicates the pitch in the Y-axis direction in the information group headed by G37. Therefore, the same address signal has different meanings which are difficult to discriminate.

SUMMARY OF THE INVENTION

With the foregoing prior difficulties in view, it is an object of the present invention to provide a system for defining graphic patterns for an NC apparatus which facilitates the operations prior to and at the time of data input.

Another object of the present invention is to provide a system for defining graphic patterns for an NC apparatus which is capable of easily checking the data entered.

Still another object of the present invention is to provide a system capable of defining graphic patterns in an NC apparatus without having to find the coordinates of an ending point prior to the data being entered in the NC apparatus.

According to the present invention, there is provided a system for defining graphic patterns in an NC apparatus, comprising, display means, display control means, data setting means, a memory, computing means, central processing means and output control means. The display control means controls the display means to display, as head items, addresses comprising the designation of a straight line or an arc for a planar graphic pattern, a vector angle of the straight line or a radius of the arc, the vector components of the straight line or coordinates of the center of the arc, and modifiers. The data setting means sets known data by successively or appropriately using addresses displayed on the display means and indicative of the straight line and the arc derived from the planar graphic pattern. The memory stores the addresses, the data set by the data setting means, and formulas. The computing means computes the set data stored in the memory according to the formulas to determine the addresses of unknown data which have not been given numerical values by the data setting means. The central processing means controls the computing means and the memory to store the results of computation effected by the computing means. The output control means is responsive to the set data and computed data stored in the memory and controls the movement of a tool of a machine tool.

The above and other objects, features and advantages of the present invention will become more apparent from the following description, taken in conjunction with the accompanying drawings in which a preferred embodiment of the present invention is shown by way of illustrative example.

BRIEF DESCRIPTION OF THE DRAWINGS

FIG. 8 is a diagram indicative of a table showing graphics definition patterns used in the present invention;

FIGS. 33 through 42 are diagrams showing patterns PTN1 through PTN7 of the groups of points illustrated in FIG. 32.

DETAILED DESCRIPTION OF THE PREFERRED EMBODIMENTS

Figure 7:
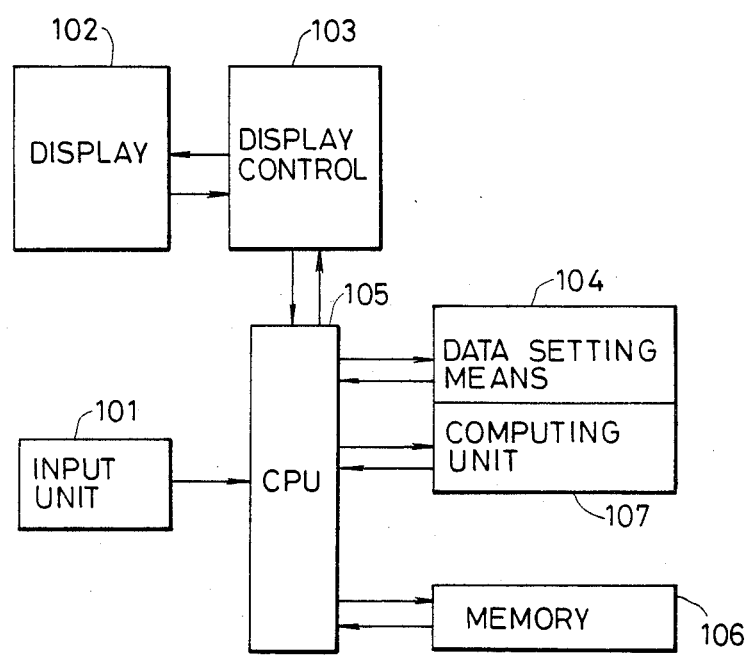
FIG. 7 is a block diagram of a NC apparatus according to the present invention.

As shown in FIG. 7, the NC apparatus includes an input unit 101 to which commands are supplied from an external source, a display unit 102 such as a CRT (cathode-ray tube), a display control unit 103 for controlling the display on the CRT 102, and a means 104 such as a keyboard for setting known data successively or appropriately using the addresses displayed on the CRT 102. The NC apparatus also has a central processing unit 105, a memory 106 for storing various information and data such as the addresses to be displayed on the CRT 102, data set by the data setting means 104, and formulas for calculating data from the set data, and a computing unit 107 operable under the control of the central processing unit 105 for computing unknown data which have not been given numerical values, based on the set data and the formulas stored in the memory 106, and for storing the computed data in the memory 106.

The NC apparatus system thus constructed for defining a graphic pattern to be followed by the tool of the machine tool device will first be described.

For defining a graphic pattern, address items required for such graphic pattern definition and stored in the memory 106 are first displayed as head items on the CRT 102 under the control of the display control unit 103. The graphic pattern is defined at this time as a straight line or an arcuate line, the head items as displayed being shared by the straight and arcuate line designations.

The head items necessary for defining a graphic pattern are:

EL X Y R/θ I J P CNR/CNC which are displayed on the CRT 102 as such.

The head items displayed as respective addresses on the CRT have the following definitions:

EL ... selection of a straight line, an arc drawn by clockwise rotation (CW), or an arc drawn by counterclockwise rotation (CCW);

X, Y ... the coordinates of an ending point;

R/θ ... radius (arc)/vector angle (straight line);

I,J ... the coordinates of an arc center (arc) or vector components (straight line);

P ... a modifier (used for indicating the position of an intersection or a point of contact of a graphic pattern), selection of upper, lower, left or right; and CNR/CNC ... selection of a corner R or a corner C.

FIG. 8 illustrates graphics definition patterns. The column marked with "NO." indicates conditions in which the data entered by the data setting means 104 are sufficient for defining a graphic pattern, the conditions being classified into the three groups A, B and C:

A ... capable of defining a graphic pattern with only the data entered;

B ... incapable of defining a graphic pattern with only the data entered, but rendered capable of defining such a graphic pattern using the data on the next following line; and C ... having more data entered than necessary for defining the immediate graphic pattern, the entered data being required for defining previous and following graphic patterns.

The column for the G code has the same content as the address EL, in which 1 designates a straight line, 2 a CW (clockwise rotation) arc, and 3 a CCW (counterclockwise rotation) arc. The symbol "0" indicates data input, "?" data which have not been given numerical values, and "→" a cursor skip. Graphic patterns given by the types A-1 through A-11, B-1 through B-5, and C-1 through C-6 are illustrated in FIGS. 2 through 4 and 9 through 27, respectively. The pattern types A-1, A-6, and A-7 have the same address as those used by the conventional graphics definition method, and have the same graphic patterns as shown in FIGS. 2, 3, and 4, respectively.

Figure 1:
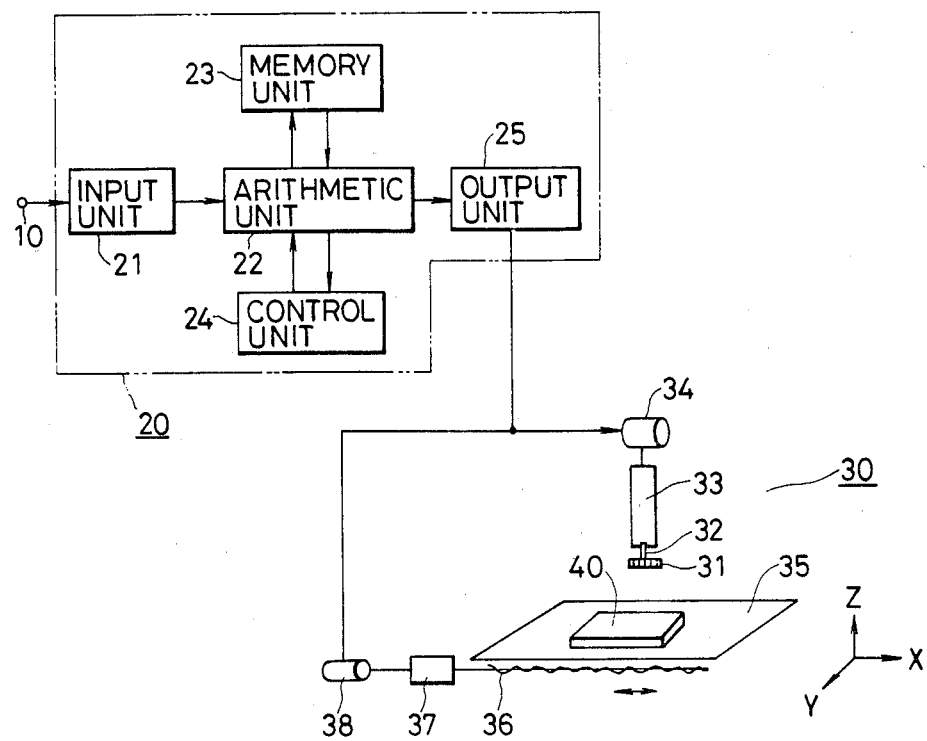
FIG. 1 is a schematic diagram, partly in block form, of an NC machine tool.
Figure 2:
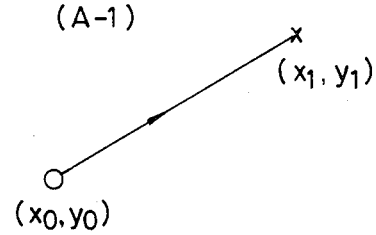
FIG. 2 is a diagram showing a straight line as conventionally defined.
Figure 3:
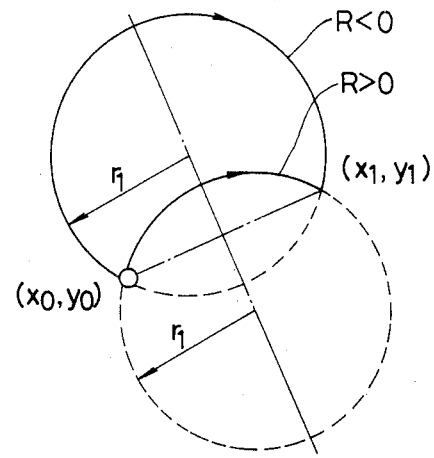
FIG. 3 is a diagram showing an arc as conventionally defined with a designated radius.
Figure 4:
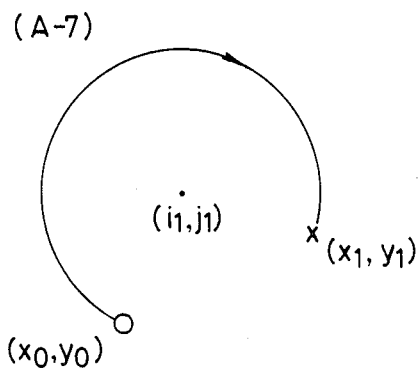
FIG. 4 is a diagram illustrating an arc as conventionally defined with designated coordinates of the arc center.

FIGS. 2 through 4 and 9 through 16 illustrate graphic patterns belonging to the A types (capable of defining graphic patterns with only the data entered). The graphic patterns shown in FIGS. 2 and 9 through 12 relate to straight lines. The graphic pattern (A-1) shown in FIG. 2 is given the coordinates of an ending point in the same manner as the conventional method of defining a graphic pattern. FIGS. 9 through 12 illustrate methods of defining graphic patterns added according to the present invention. Each of the graphic patterns of FIG. 9(A-2) and FIG. 10(A-3) is given one of the coordinates of an ending point and a vector angle, and each of the graphic patterns of FIG. 11(A-4) and FIG. 12(A-5) is given one of the coordinates of an ending point and vector components.

Figure 9:
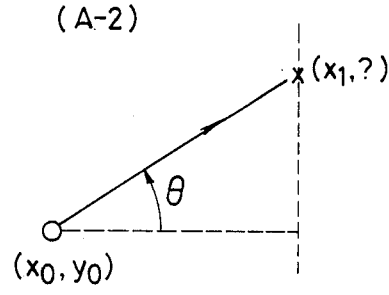
FIGS. 9 through 27 are diagrams illustrating graphics definition lines newly added according to the present invention.
Figure 10:
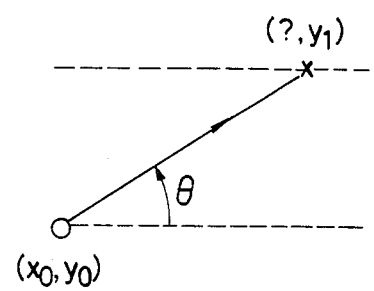
Figure 11:
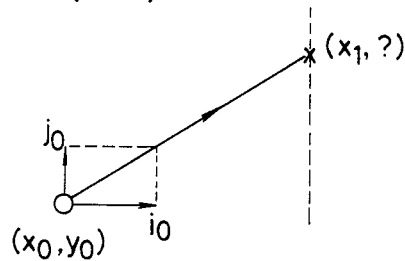
Figure 12:
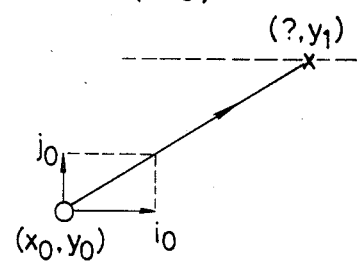
Figure 13:
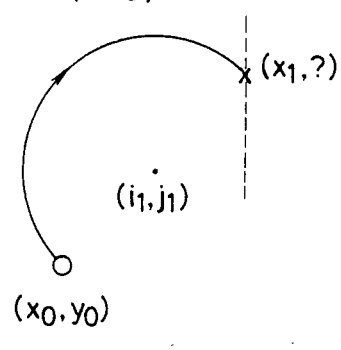
Figure 14:
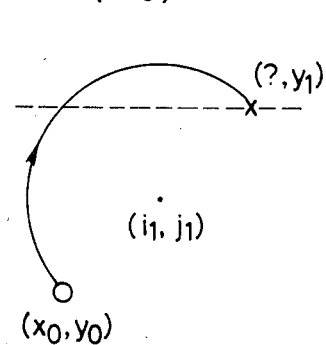
Figure 15:
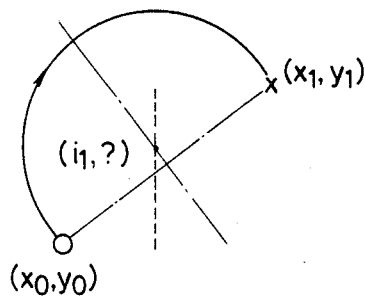
Figure 16:
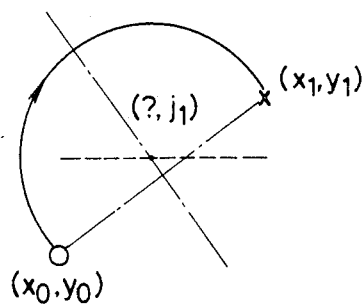

The unknown coordinates in the patterns (A-2), (A-3) shown in FIGS. 9 and 10 can be determined by the computing unit 107 through arithmetic operations on the set values or known coordinates of the ending points and the vector angles. Likewise, the unknown coordinates in the patterns (A-4), (A-5) shown in FIGS. 11 and 12 can be determined through arithmetic operations on the set values or known coordinates of the ending points and the vector components.

FIGS. 3 and 4 and 13 through 16 illustrate arcuate lines. The graphic pattern shown in FIG. 3(A-6) is the same as a conventional arc with a designated radius, and the graphic pattern shown in FIG. 4(A-7) is the same as a conventional arc with a designated arc center. These patterns are given the coordinates of ending points and radii (with a positive or a negative sign) or the coordinates of arc centers. FIGS. 13 through 16 are illustrative of methods for defining graphic patterns, added according to the present invention. Each of the graphic patterns shown in FIG. 13(A-8) and FIG. 14(A-9) is given one of the coordinates of an ending point and the coordinates of an arc center, and each of the graphic patterns shown in FIG. 15(A-10) and FIG. 16(A-11) is given one of the coordinates of an arc center and the coordinates of an ending point. The unknown coordinates of the ending points and arc centers in the graphic patterns defined in FIGS. 13 through 16 can be computed by the computing unit 107 from the data set by the data setting means 104 (given values) and stored in the memory 106 using mathematical formulas.

FIGS. 17 through 21 illustrate graphic patterns belonging to the B type (incapable of defining a graphic pattern with only the data entered, but rendered capable of defining a graphic pattern using the data on the next following line). These illustrated methods of defining graphic patterns can be added according to the present invention. In all of these methods, no coordinates of the ending points are given and the modifier P is employed.

Figure 17:
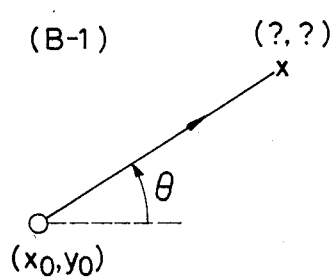
Figure 18:
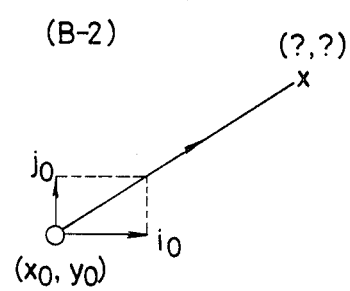
Figure 19:
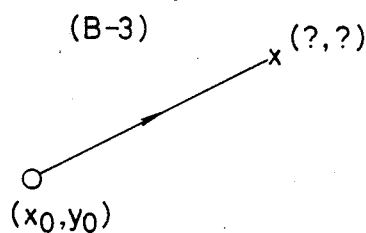
Figure 20:
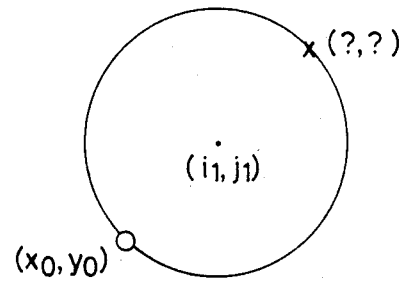
Figure 21:
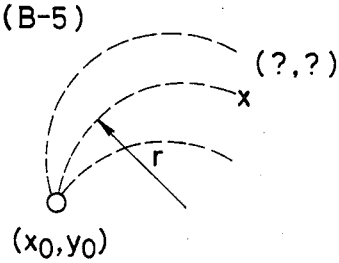

FIGS. 17 and 19 show straight lines. The graphic pattern of FIG. 17(B-1) is given a vector angle, and the graphic pattern of FIG. 18(B-2) is given vector components. The graphic pattern shown in FIG. 19(B-3) is used only when the line will contact an arc, and is given no vector angle and no vector components. FIGS. 20 and 21 illustrate arcs. The graphic pattern of FIG. 20(B-4) is given only the coordinates of the arc center, and the graphic pattern of FIG. 21(B-5) ia given only the radius.

The B-type graphic patterns shown in FIGS. 17 through 21 remain unspecified as they are, and do not supply enough information as to the coordinates, etc. to permit the tool to follow the required paths. These graphic patterns can be completely defined on the basis of data for the next following line. Therefore, the coordinates of the ending point are found by the computing unit 107 through computations using the data for the next following line, to thereby define the desired graphic patterns.

FIGS. 22 through 27 show graphic patterns belonging to the C type (having more data entered than necessary for defining the immediate graphic pattern, the entered data being required for defining previous and following graphic patterns). These graphic patterns can be added according to the present invention, and employ the modifier P.

Figure 22:
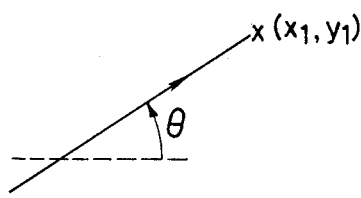
Figure 23:
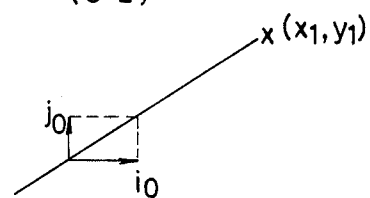
Figure 24:
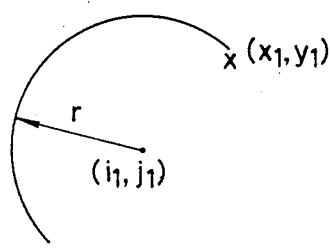
Figure 25:
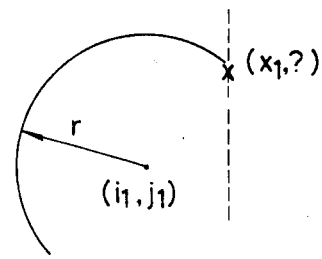
Figure 26:
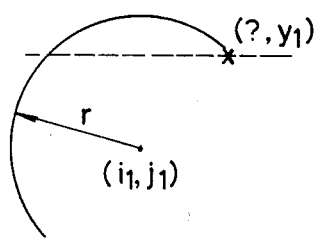
Figure 27:
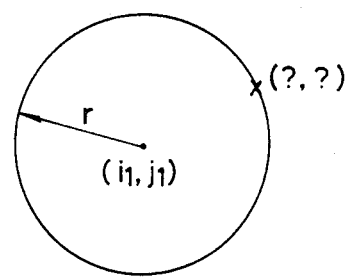

The patterns shown in FIGS. 22 and 23 are directed to straight lines. Each of the graphic patterns shown in FIG. 22(C-1) and FIG. 23(C-2) is given the coordinates of an ending point, a vector angle or vector components. The patterns of FIGS. 24 through 27 are arcuate lines. The graphic pattern of FIG. 24(C-3) is given the coordinates of an ending point, a radius, and the coordinates of the arc center. Each of the graphic patterns illustrated in FIG. 25(C-4) and FIG. 26(C-5) is given one of the coordinates of an ending point, a radius, and the coordinates of the arc center. The graphic pattern shown in FIG. 27(C-6) is given a radius and the coordinates of the arc center.

Therefore, graphic figures can be defined by various patterns. According to the graphic pattern definitions of the A and C types, the coordinates of the ending points can be computed on the basis of the set data defined. According to the graphic pattern definitions of the B type, the coordinates of the ending points can be computed on the basis of the set data defined by the other pattern types, as described in the examples below.

Consequently, any machining path for the tool of the machine tool can be defined as a desired graphic figure or pattern composed of the combination of the various patterns described above. The tool can be moved under the control of the set data and the computed data stored in the memory 106.

Examples of combinations of the graphics definition patterns shown in FIG. 8 are illustrated in FIGS. 28 through 31.

Figure 28:
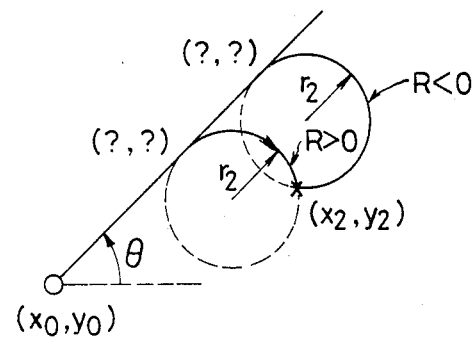
FIGS. 28 through 31 are diagrams showing combinations of the lines.

FIG. 28 shows a graphic pattern which is a combination of the patterns illustrated in FIG. 17(B-1) and FIG. 3(A-6). A data input example is as follows:

| G code | X  | Y  | R/θ |
|--------|----|----|-----|
| G01    | ?  | ?  | θ   |
| G02    | x2 | y2 | r2  | where X, Y are the coordinates of an end point, and R/θ the radius (arc) or vector angle (straight line).

This data input can be effected by setting the known data on the data setting means 104 while watching the addresses displayed on the CRT 102. At this time, the known data are entered assuring knowledge of the machining path of the tool.

In the pattern example shown in FIG. 28, only the vector angle is known for the straight line G01 with the other data unknown, and all the data are known for the arcuate line G02. Coordinate computation is effected by the computing means 107 to find the intersections to thereby calculate the coordinates of the unknown ending point. In this manner, a graphic pattern can be defined in which the tool can move along a straight line and then an arc.

Figure 29:
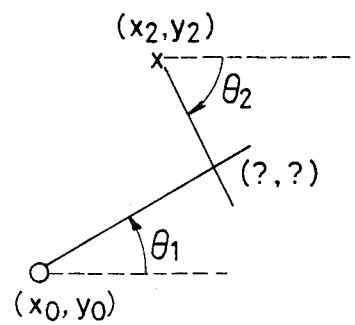

FIG. 29 shows a graphic pattern which is a combination of the patterns illustrated in FIG. 17(B-1) and FIG. 22(C-1). A data input example is as follows:

| G code | X  | Y  | R/θ |
|--------|----|----|-----|
| G01    | ?  | ?  | θ1  |
| G01    | x2 | y2 | θ2  | where θ2 is a negative vector angle. The unknowns may be calculated and employed to define the combined graphic pattern similarly as described above.

Figure 30:
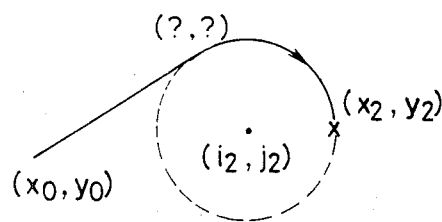

FIG. 30 shows a graphic pattern which is a combination of the patterns illustrated in FIG. 19(B-3) and FIG. 4(A-7). A data input example for a CW arc is as follows:

| G code | X  | Y  | R/θ  | I    | J    |
|--------|----|----|------|------|------|
| G01    | ?  | ?  | ?/→  | ?/→  | ?/→  |
| G02    | x2 | y2 | ?/→  | i2   | j2   |

Figure 31:
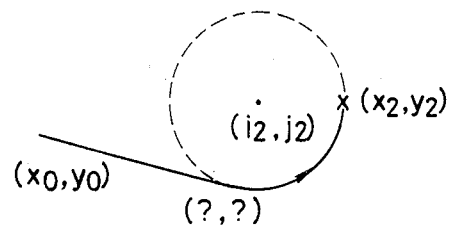

FIG. 31 shows a graphic pattern similar to that of FIG. 30, but the direction of rotation along the arc is different. A data input example for a CCW arc is as follows:

| G code | X  | Y  | R/θ  | I    | J    |
|--------|----|----|------|------|------|
| G01    | ?  | ?  | ?/→  | ?/→  | ?/→  |
| G03    | x2 | y2 | ?/→  | i2   | j2   |

The difference between the graphic patterns of FIGS. 30 and — is that the G code G02 in the former pattern is changed to the G code G03 in the latter pattern.

With this embodiment, any graphic pattern to be defined is divided into straight and arcuate lines which are designated without having to specify the coordinates of ending points as has been conventional. More specifically, the known data on a straight line can be set by successively or appropriately using addresses of ending point coordinates (X,Y), a vector angle θ, vector components (I,J), and a modifier. Known data on an arc can be set by successively or appropriately using addresses of ending point coordinates (X,Y), a radius R, coordinates (I,J) of an arc center, and a modifier P. Thus, a total of six addresses are used. Any unknown data which have not been given numerical values are computed using the known data.

Data can be established by successively or appropriately setting known data or data that can easily be determined in accordance with addresses while referring to the graphics definition patterns given in the table of FIG. 8. Accordingly, any graphic pattern can be defined without determining any ending point coordinates.

While in the foregoing embodiment the addresses displayed on the display unit are given as head items shared by straight and arcuate lines, they may be differently displayed respectively for straight and arcuate lines as follows:

| Straight lines: | X | Y | θ | I | J | P | (CNR/CNC) |
| Arcuate lines:  | X | Y | R | I | J | P | (CNR/CNC) |

According to the present embodiment, as described above, any planar graphic pattern can be defined without previously determining any ending point coordinates since the ending point coordinates can be later computed using other data. Furthermore, addresses can be displayed in advance for easier data input for graphic pattern definition than in conventional arrangements, in which the numerical data and addresses were simultaneously specified.

A system for defining the machining positions for the tool of a machine tool as a graphic pattern composed of a group of points will now be described.

In defining a group of points, such are grouped into patterns, and such patterns are selected and data set through the data setting means 104 according to head items or addresses displayed on the CRT 102.

Figure 32:
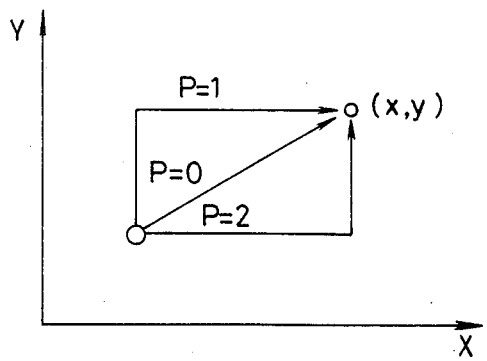
FIG. 32 is a pattern diagram showing the patterns of groups of points.

FIG. 32 illustrates the addresses displayed as head items on the CRT 102, there being ten addresses and three modifiers. The ten addresses shown in FIG. 32 are PTN, Z, X, Y, AN1, AN2, T1, T2, Na, and N2, and the three modifiers are TSL, P, and Q. These modifiers allow conditions to be selectively designated for an increased number of shapes to be established.

The point group patterns PTN include a pattern PTN1 composed of a point, a pattern PTN2 of a row of points, a pattern PTN3 of a rhombus, a pattern PTN4 of a grid-like rhombus, a pattern PTN5 of a circle, a pattern PTN6 of an arc, and a pattern PTN7 of a chord. Designated at Z is the depth of cut and at X, Y the coordinates of a reference point. The coordinates X, Y indicate those of the first point for the patterns of the point, row of points, rhombus, and grid-like rhombus, and indicate those of the arc center for the patterns of the circle, arc, and chord. The address AN1 represents an angle $\theta1$ with a reference axis (X axis), specifying a first direction, and the address AN2 represents an angle $\theta2$ with the reference axis (X axis) or the first direction, specifying a second direction. The address T1 indicates the pitch t1 or the entire length l1 in the first direction for the pattern of the row of points, rhombus, and grid-like rhombus, and the radius R for the patterns of the circle, arc, and chord. The address T2 is representative of the pitch t1 or the entire length l1 in the second direction for the patterns of the rhombus and grid-like rhombus, and the chord length for the chord pattern. The address N1 is indicative of the number n1 of machining positions in the first direction for the patterns of the row of points, rhombus, and grid-like rhombus, and the number n1 of machining positions for the patterns of the circle and arc. The address N2 represents the number n2 of machining positions in the second direction for the patterns of the rhombus or grid-like rhombus. In each machining position, the workpiece is bored or tapped by the tool. Therefore, the depth of the cut can be specified as an address.

The modifier TSL serves to affect the point patterns of the row of points, rhombus, grid-like rhombus, and arc, and selects an incremental command (INC) or an absolute command (ABS).

With the patterns of the row of points, rhombus, and grid-like rhombus, an incremental command is expressed by the pitch or a point-to-point interval between adjacent points on a straight line, and an absolute command is expressed by the entire length equal to the distance between the first point and the final point. For the pattern of an arc, an incremental command is defined as an angle formed between two adjacent points, and an absolute command is defined as an angle formed between the reference axis (X axis) or a straight line in the first direction and the final point.

The modifier P is effective in affecting the point patterns of point, rhombus, and grid-like rhombus patterns. For the pattern of a point, the modifier P selects one of three tool paths leading to a reference point. For the patterns of rhombus and grid-like rhombus, the modifier P determines whether the four corners are to be bored or not. For the pattern of an arc, the modifier P selects an orientation for a boring position with respect to a straight line in the first direction indicated by the angle with the reference axis (X axis).

The modifier Q is effective in affecting the point patterns of point, row of points, rhombus, grid-like rhombus, and arc patterns, by determining whether the first point is to be used only for positioning or is to be bored.

The patterns PTN1 through PTN7 shown in FIG. 32 will hereinafter be described.

Figure 5:
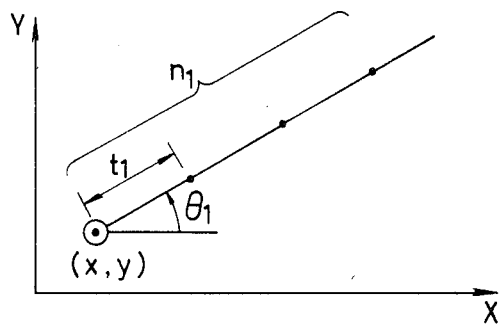
FIG. 5 is a diagram illustrative of a line at an angle as conventionally defined.

FIG. 33 shows a shape defined by the pattern PTN1 (point). For the definition of a point shown in FIG. 33, the pattern PTN1 displayed as an address item on the CRT 102 is selected through the data setting means 104. Then, the cut depth Z is established as required, and the coordinates of a reference point, that is, point coordinates X, Y are established through the data setting means 104. In defining a point through the selection of the address item and the coordinate setting, there are three paths available for the tool to move from its current position to the reference point X, Y, as shown in FIG. 33. Tool movements along these three paths include tool movement along the shortest straight path toward the reference point (P=0), a tool movement along a first path parallel to the Y axis and a second path parallel to the X axis, and a tool movement along a first path parallel to the X axis and a second path parallel to the Y axis. The tool moves along a predetermined one of the tool paths. Any desired one of the tool paths can be selected by selecting and setting modifier P through the data setting means 104.

Where a row of points as shown in FIG. 5 is to be defined in this graphics definition system, the pattern PTN2 displayed as an address item on the CRT 102 is selected by the data setting means 104, and then the address items such as the cut depth Z, the reference point coordinates X, Y, the angle $\theta1$, the pitch t1, and the number n1 of machining positions are established.

FIG. 34 shows an instance in which a row of points is set using the entire length l1 of the row. The other data are selected and set in the same manner as where the row of points is defined using the pitch t1.

A row of points is normally defined by either the mode of FIG. 5 in which the pitch t1 is employed or the mode of FIG. 34 in which the entire length l1 is used. These modes can be selected as desired by employing the modifier TSL.

FIG. 35 is illustrative of a pattern PTN (rhombus) as defined by pitches t1, t2. For defining a group of points making up a rhombus, the pattern PTN3 displayed as an address item on the CRT 102 is selected. Then, the address items such as the cut depth Z, the reference point coordinates X, Y, the angles $\theta1$, $\theta2$, the pitches t1, t2, and the numbers n1, n2 of machining positions are established. In operation, the operator enters these data settings through the data setting means 104 while watching the CRT 102, the entered data being stored in the memory 106. The computing unit 107 is controlled by the central processing unit 105 to effect arithmetic operations on the stored data according to formulas stored in the memory 106 to thereby compute the coordinates of the machining positions other than the reference point. The computed coordinates are then stored in the memory 106.

The tool of the machine tool is then moved according to the machining position coordinate data stored in the memory 106.

Where a point pattern of a rhombus is to be defined, it can be defined using the entire lengths l1, l2 in the same manner as that of the pattern PTN2 (row of points). Either of the pitch-based or length-based rhombus definitions can be selected as desired by the use of the modifier TSL.

For the length-based rhombus definition, the same procedure as described above is followed. More specifically, the pattern PTN (rhombus) displayed as an address item on the CRT 102 is selected as the pattern, and the reference point and other necessary address items are set through the data setting means 104. The coordinates of machining positions other than the reference point for the selected pattern are then computed by the computing unit 107, and the computed coordinates are stored in the memory 106 to thereby define a point group graphic pattern. The tool can be moved according to the coordinates stored in the memory 106 up to the defined point group positions.

FIG. 36 illustrates a grid-like rhombus pattern PTN4 selected as a point group pattern and defined by the pitches t1, t2. Like the patterns PTN2 (row of points) and PTN3 (rhombus), the grid-like rhombus pattern can also be defined using the entire lengths l1, l2. Normally, one of these modes is always used. However, the modes can be selectively used via the modifier TSL.

Figure 6:
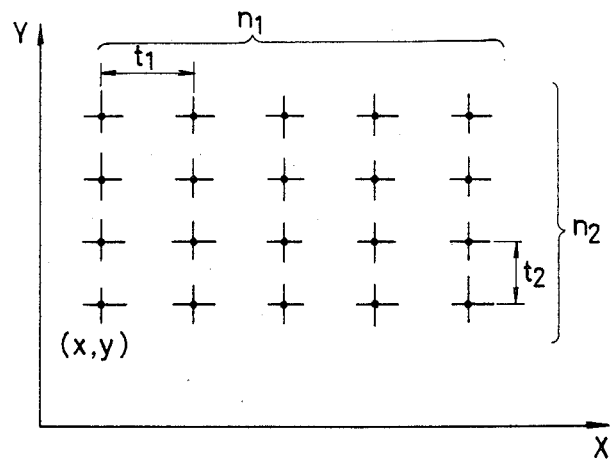
FIG. 6 is a diagram showing a grid-like pattern of points as conventionally defined.

If $\theta 1=0$ and $\theta 2=90°$ in FIG. 36, then the resultant pattern is the same as the grid-like pattern shown in FIG. 6, which is conventionally specified by the grid G37.

FIGS. 38 and 39 are illustrative of patterns defined by the pattern PTN6 (arc). The example shown in FIG. 38 is set by the angle $\theta 2$ formed between two adjacent points in the pattern PTN6 (arc), and the example shown in FIG. 39 is set by the angle $\theta 2$ formed between the reference axis (X axis) or the straight line in the first direction and the final point in the pattern PTN6 (arc). Normally, one of these two modes is constantly used, but the two can be selectively employed using the modifier TSL.

FIGS. 40, 41 and 42 show graphic patterns defined by the pattern PTN7 (chord). FIG. 40 illustrates an example in which machining positions are located on both sides of the straight line in the first direction specified by the angle $\theta 1$. FIG. 41 shows an example in which the machining position is located on the lefthand side of the straight line, and FIG. 42 shows an example in which the machining position is located on the righthand side. Normally, one of these three modes is fixedly used. However, the modes shown in FIGS. 40, 41 and 42 can be selectively used by employing the modifier P.

In FIGS. 35 and 36 showing the point group patterns PTN3 (rhombus) and PTN4 (grid-like rhombus), the angle $\theta 2$ indicating the second direction is given with respect to the first direction specified by the angle $\theta 1$. In FIG. 39 showing the pattern PTN6 (arc), the angle $\theta 2$ up to the final point is defined with respect to the first direction specified by the angle $\theta 1$. However, this angle $\theta 2$ may be expressed with respect to the reference axis (X axis).

With the system according to the invention, ten addresses are given inherent meanings and displayed as head items on the display unit. Therefore, it is unnecessary to enter the addresses each time data is entered. Since the positions of the same kind are determined, the data can be easily checked.

Although a certain preferred embodiment has been shown and described, it should be understood that many changes and modifications may be made therein without departing from the scope of the appended claims.

What is claimed is:

1. A system for defining graphic patterns for an NC apparatus, comprising:
   display means;
   display control means for controlling said display means to display addresses identifying data for defining a graphic pattern;
   data setting means for setting known data corresponding to the addresses displayed on said display means and indicative of the desired graphic pattern, said display control means, when known data corresponding to less than all of said displayed addresses are set, continuing to display the addresses of unknown data not set by said data setting means, with the display adjacent each unknown data address indicating, e.g., by means of a blank display area, that said each address corresponds to unknown data;
   a memory for storing said addresses, the data set by said data setting means, and mathematical formulas;
   computing means for operating on said set data stored in said memory according to said formulas to determine the values of unknown data which have not been given numerical values by said data setting means;
   central processing means for controlling said computing means and said memory to store the results of computations effected by said computing means; and
   output control means responsive to the set data and computed data stored in said memory for controlling the movements of a machine tool.

2. A system according to claim 1, wherein said graphic pattern comprises a planar pattern composed of a straight line, an arc or combinations thereof, said addresses comprising designations for a straight line, an arc, the coordinates of an end point of the graphic pattern, a vector angle of said straight line, a radius of said arc, vector components of said straight line, arc center coordinates and a modifier.

3. A system according to claim 1, wherein sid graphic pattern comprises a planar pattern composed of at least one line, and wherein said data setting means includes means for designating rounding or beveling of an ending point of each line.

4. A system according to claim 1, wherein said display control means includes means for displaying the results of the computation of the unknown data, using known data.

5. A system according to claim 1, wherein said display control means includes means for displaying the results of the computation of the unknown data, using known data, in the display area adjacent each displayed unknown data address.

6. A system according to claim 1, wherein said display control means displays as head items addresses corresponding to coordinates of an ending point of a straight line, a vector angle of the straight line, vector components of the straight line, and a modifier, in displaying the straight line.

7. A system according to claim 1, wherein said display control means displays, as head items, addresses corresponding to coordinates of an ending point of an arc, a radius of the arc, coordinates of the center of the arc, and a modifier, in displaying the arc.

8. A system according to claim 1, wherein said display means comprises a cathode-ray tube.

9. A system according to claim 8, wherein said data setting means comprises a keyboard.

10. A system for defining a graphic pattern for an NC apparatus, said pattern comprising a planar pattern composed of a straight line, an arc or combinations thereof, said system comprising:
    display means;

display control means for controlling said display means to display addresses corresponding to data for identifying said graphic pattern, said addresses comprising designations for a straight line, an arc, the coordinates of an end point of the graphic pattern, a vector angle of said straight line, a radius of said arc, vector components of said straight line, arc center coordinates and a modifier specifying the position of an intersection or a point of contact of the graphic pattern;

data setting means for setting known data using said addresses displayed on said display means and respresenting the desired graphic pattern;

a memory for storing said addresses, the data set by said data setting means, and mathematical formulas;

computing means for operating on said set data stored in said memory according to said formulas to determine the values of unknown data which have not been given numerical values by said data setting means;

central processing means for controlling said computing means and said memory to store the results of computations effected by said computing means; and output control means responsive to the set data and computed data stored in said memory for controlling the movements of a machine tool.

11. A system according to claim 10, wherein said computing means computes said unknown data of a set line using the data of the set line and the set data of the next following line.

12. A system for defining graphic patterns of groups of points for an NC apparatus, said groups of points including a point, a row of points, a rhombus, a grid-like rhombus, a circle, an arc, and a chord, said system comprising:

display means;

display control means for controlling said display means to display addresses corresponding to said graphic patterns of groups of points, said addresses including addresses corresponding to coordinates of a reference point, an angle with respect to a reference axis indicating a first direction, an angle with respect to said reference axis or said first direction and indicating a second direction, one of a pitch, an entire length or a radius in said first direction, one of a pitch or an entire length in said second direction, the number of points in said first direction, the number of points in said second direction, and modifiers;

data setting means for selecting one of said graphic patterns and setting known data corresponding to addresses displayed on said display means and associated with the selected graphic pattern, said data setting means including means for setting data by selecting a pitch or an entire length for the patterns of a row of points, rhombus, and a grid-like rhombus using one of said modifiers, and for setting data by selecting an angle formed between two adjacent points or an angle formed between the reference axis or the straight line in the first direction and a final point for the pattern of an arc, using one of said modifiers;

a memory for storing said addresses, the data set by said data setting means, and mathematical formulas;

computing means for computing said set data stored in said memory according to said formulas to determine the values of unknown data corresponding to some of said displayed addresses which have not been given numerical values by said data setting means;

central processing means for controlling said computing means and said memory to store the results of computations effected by said computing means; and output control means responsive to the set data and computed data stored in said memory for controlling the movement of a machine tool.

13. A system according to claim 12, wherein said data setting means includes means for specifying patterns by selecting, using one of said modifiers, a tool path up to a reference point for the pattern of a point, whether the four corners are to be bored for the patterns of a rhombus or a grid-like rhombus, or by selecting an orientation of the position of a point with respect to the first direction defined by the angle with the reference axis.

14. A system according to claim 12, wherein said data setting means includes means for determining whether a first point in the patterns of a point, a row of points, a rhombus, a grid-like rhombus, and an arc is to be used only for positioning or is to be bored, using one of said modifiers.

15. A system according to claim 12, wherein said output control means enables the tool to move to a position on the selected graphic pattern and bore said position.

16. A system according to claim 15, wherein said items displayed under the control of said display control means includes an address for the depth of cut.

17. A system according to claim 12, wherein said display means comprises a cathode-ray tube and said data setting means comprises a keyboard.

* * * * *